Oct. 18, 1938.  A. W. LEMMON  2,133,391
TROLLEY CONVEYER
Filed April 9, 1936  2 Sheets-Sheet 2
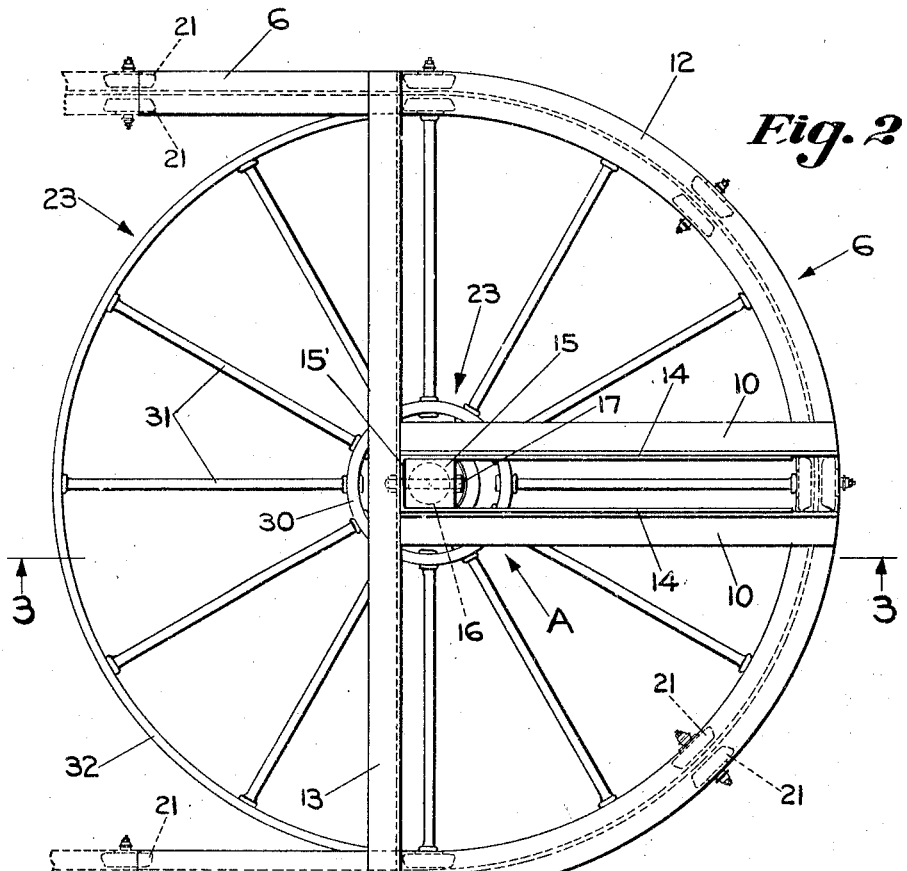
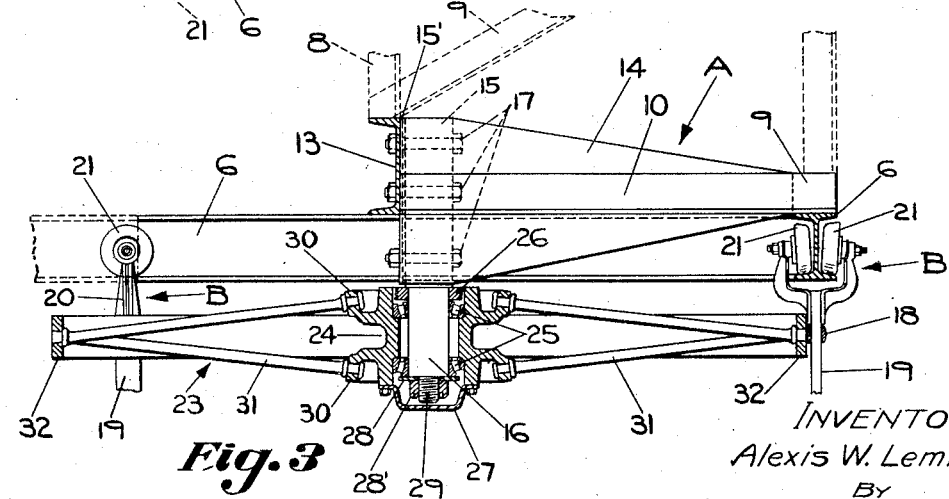
INVENTOR:
Alexis W. Lemmon
By
Chas. M. Nissen,
Atty.

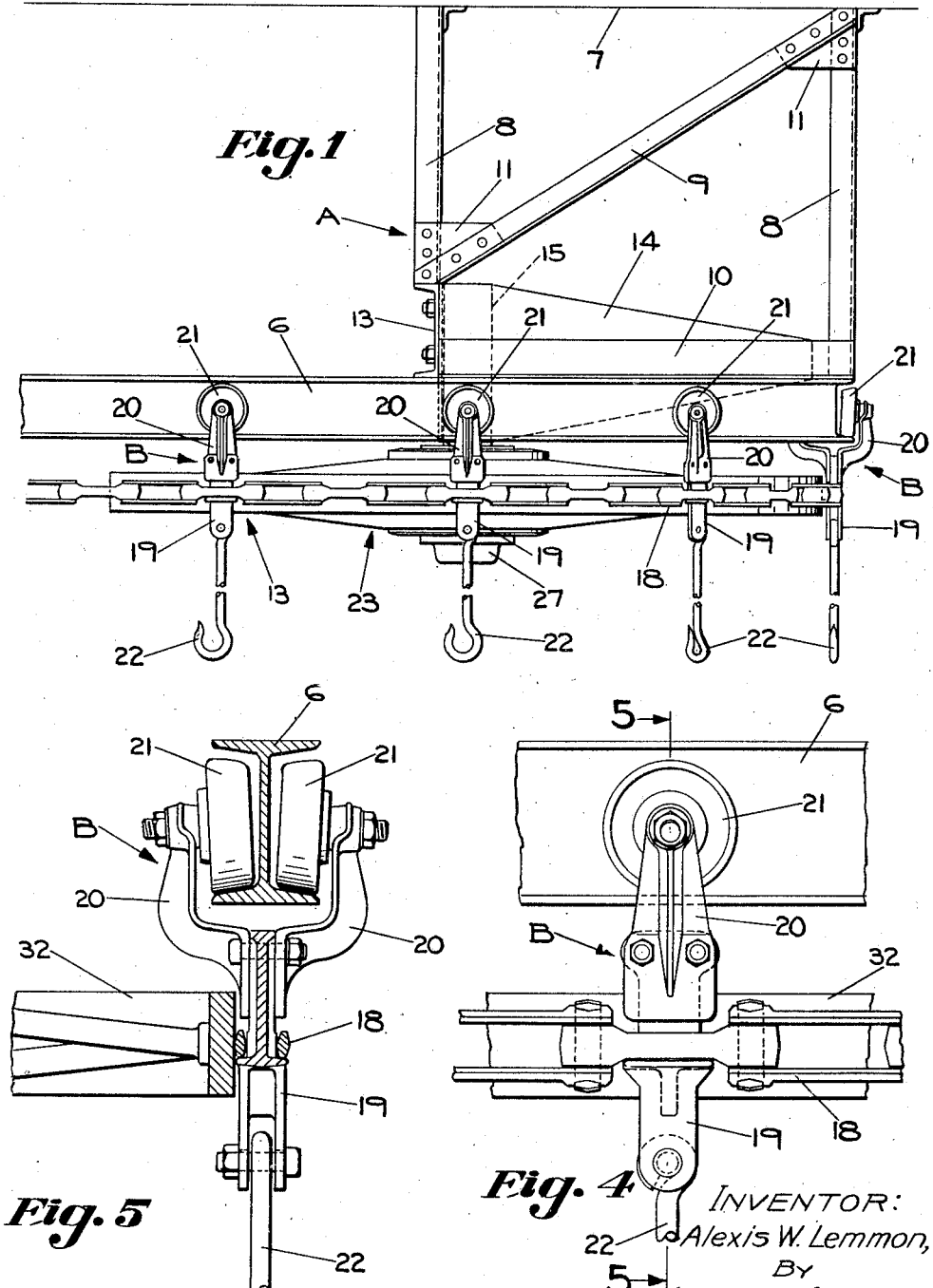

Patented Oct. 18, 1938

2,133,391

UNITED STATES PATENT OFFICE 2,133,391

TROLLEY CONVEYER

Alexis W. Lemmon, Columbus, Ohio, assignor to The Jeffrey Manufacturing Company, a corporation of Ohio Application April 9, 1936, Serial No. 73,496

12 Claims. (Cl. 198—177)

This invention relates to a trolley conveyer and more particularly to an improved means for maintaining the hangers of a trolley conveyer in a vertical position while the conveyer changes its direction of travel.

An object of the invention is to provide an improved means for maintaining the hangers of a trolley conveyer in a vertical position during a change of direction with a minimum amount of friction and wear.

Another object of the invention is to provide an improved anti-friction means for mounting and guiding a trolley conveyer while making a turn.

Other objects of the invention will appear hereinafter, the novel features and combinations being set forth in the appended claims.

Fig. 1 is an elevational view of a portion of a trolley conveyer incorporating the features of my invention;

Fig. 2 is a plan view of the device of Fig. 1;

Fig. 3 is a sectional elevational view taken on the line 3—3 of Fig. 2;

Fig. 4 is an enlarged detail view showing the trolley hanger and its relation to the supporting rail and the guide means; and Fig. 5 is a partial sectional view taken on the line 5—5 of Fig. 4.

Referring particularly to Figs. 1 and 2 of the drawings, there is illustrated a portion of a trolley conveyer system in which the direction of travel of the trolley conveyer is reversed or, in other words, one end of a reversing trolley conveyer is disclosed.

The super-structure A comprises a guide rail 6 in the form of an I-beam which is supported from the ceiling 7 of a building by appropriate angle members comprising downwardly extending angle members 8, laterally extending, inclined angle members 9 and horizontal angle members 10. The angle members 8 and 9 are rigidly attached by gusset plates 11.

Extending transversely between the two parallel portions of rail 6 and near the diameter of the curved portion 12 of said guide rail, is channel 13 which is rigidly attached to the members 8 and 9 and to the tops of said parallel portions of the guide rail 6, as by welding.

A U-shaped member 14 provides a pair of spaced reinforcing side plates which, as seen in Figs. 1 and 3, are tapered or increase in height adjacent the center of the curved portion 12 and which are rigidly attached along their sides to the angle members 10, as by welding, thus providing a rigid support for the curved portion 12 of the guide rail 6. The free ends of said U-shaped member 14 are welded to the I-beam guide rail 6.

As best seen in Fig. 2 of the drawings, the angle members 10 and reinforcing side plates of member 14 are spaced apart in parallel relation and carry a squared axle shaft 15 provided with a rounded bearing portion 16. The squared axle shaft 15 is rigidly attached to the channel 13 and the U-shaped member 14 by appropriate bolts 17. Spacinf shims 15' may be provided between the shaft 15 and the bottom of U member 14 to compensate for wear. The tapered side plates of member 14 provide an enlarged bearing and attaching surface for shaft 15, thereby holding it rigidly in place to resist the forces acting on bearing 16 during operation of wheel 23. It will thus be evident that a very rigid superstructure A is provided for supporting the guide rail 6, particularly adjacent the curved portion 12 thereof, which carries an axle shaft located at the center of curvature of said curved portion 12 of the guide rail 6. It is also to be noted that this superstructure has a minimum of weight without sacrificing strength. One contributing feature is the novel support for axle shaft 15 which eliminates the necessity of a journal box, yet provides a very rigid support therefor.

A trolley conveyer B, comprising a chain 18 and a plurality of spaced hangers 19 carried by hanger brackets 20, 20 and supporting trolley rollers 21, 21, is adapted to carry any desired material by appropriate material hooks 22. It will be evident that when a longitudinal force is applied to the chain 18 the trolley hangers 19 and material hooks 22 will be moved along the guide rail 6 and may therefore be employed to convey material from one position to another. It is evident that the force along the chain 18 would disrupt the proper operation of the trolley conveyer B as it rounded the curved portion 12 of the guide track 6 unless some means were provided to maintain the hangers 19 and the hooks 22 in a vertical position during this portion of their travel. My invention comprises improved means for maintaining the vertical relation of said hangers and material hooks and for the additional purpose of maintaining proper contact between the trolley rollers 21, 21 and the guide rail 6 adjacent the curved portion 12 thereof.

This means comprises an anti-friction mounted wheel 23 having a hub portion 24 mounted upon the cylindrical bearing portion 16 of axle shaft 15 by anti-friction bearings shown in the form of tapered roller bearings 25. An appropriate grease seal 26 is provided for the upper roller bearing 25 and a removable cap 27 is attached to the lower portion of the hub 24 and provides a grease seal for the lower roller bearing 25. The lower end of the bearing portion 16 carries a washer 28 adapted to retain the lower roller bearing 25 on the bearing portion 16 by means of a nut 28' threaded to a threaded extension 29 on said bearing portion 16. The hub 24 is provided with spaced circumferential flanges 30, 30 adjacent the edges thereof which are adapted to carry spokes 31 to the outer ends of which is attached the smooth-faced cylindrical wheel rim 32. It is evident that due to the spaced construction of the circumferential flanges 30 alternate spokes 31 will be spaced apart adjacent the hub 24, thus providing for a very rigid construction of the wheel 23, and providing a wheel of minimum weight without sacrificing strength.

The wheel rim 32 has such a diameter that when the chain 18 moves around the curved portion 12 of the guide track 6, the hangers 19 and material hooks 22 will be maintained in vertical positions and the trolley rollers 21, 21 will be retained in their proper relation to the guide tracks afforded by the guide rail 6.

Due to the anti-friction mounting of the wheel 23 on the bearing portion of axle shaft 15, there will be no rubbing of friction surfaces between the trolley conveyer B and the super structure A. As a consequence, there will be a minimum of wear upon all the moving parts while the trolley wheel changes its direction of travel.

It will, of course, be evident that the guide rail 6 may be curved either more or less than 180 degrees, as illustrated in Fig. 2, and the wheel 23 would still be useful to form a guide for the trolley conveyer B regardless of the extent of curvature thereof.

In the operation of the device, the trolley conveyer B will be driven along the guide rail 6 by the application of power to the chain 18 by means not illustrated but well-known in the art. As the trolley conveyer B changes its direction of travel around the curved portion 12 of the guide rail 6, the force on chain 18 will tend to pull the hangers 19 from a vertical position toward the center of curvature of said curved portion 12. This tendency will be resisted by the contacting of the chain 18 of said trolley conveyer B with the rim 32 of the wheel 23. This contacting of the chain 18 and the rim 32 will transfer sufficient force to the wheel 23 to rotate it about the bearing portion 16 of axle shaft 15. It is evident that a very small force will be required to rotate said wheel 23 due to the anti-friction mounting thereof. Said wheel 23 will therefore guide the trolley conveyer B around the curved portion 12 of the guide rail 6 while maintaining the hangers 19 and material carrying hooks 22 in a vertical position. The arms 20 are detachably secured to the hangers 19 by appropriate bolts and nuts and thus may be readily removed thereby permitting free removal of the hangers 19 from the chain 18 by sliding said hangers 19 downwardly through apertures in the chain links. It is also to be noted that these apertures permit twisting of the chain 18 somewhat without twisting the hangers 19. As a consequence any twisting of the chain 18 occasioned by its contact with rim 32, or for other reasons, will not require a twisting of the hangers 19 from their upright position and thus will not disturb the most efficient and non-friction position of the trolley wheels 21 relative to the guide rail 6.

It is to be noted that the hangers 19 are supported on the curved portion 12 of the trolley track 6 in position to support the chain at the height of the rim 32 of the idler wheel 23. The draft exerted on the chain to drive the same is transmitted to the hangers 19 intermediate the trolley and the load carried by the hooks 22 and the chain being suspended at the periphery or rim 32 of the idler wheel 23, enables the latter to take the inward radial thrust due to change of direction of travel of the chain. Consequently the hangers 19 remain in vertical positions during such change in direction of travel of the chain and the trolley structures remain in most efficient traveling positions with minimum frictional contact with the curved track 12.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention what I desire to secure by Letters Patent of the United States is:

1. In a trolley conveyer, the combination with a curved trolley rail, of a wheel for guiding a trolley conveyer about said rail, supporting means for said wheel comprising a transverse member attached at each end to said curved rail, parallel spaced supporting members extending from approximately the center of said member and attached thereto and to said rail, a wheel supporting axle having a portion supported by said transverse member and between said spaced supporting members, and bolts extending transversely through said axle and into said supporting means to effect said axle support.

2. In a trolley conveyer, the combination with a curved trolley rail, of a wheel having a radius approximately equal to the radius of curvature of said rail, an axle for supporting said wheel and rail in operative relation, said axle being positioned at the center of curvature of said rail, and means including a U-shaped plate extending from the axle to the rail and carrying the axle at the bottom of the U thereof for rigidly attaching said axle and said rail.

3. In a trolley conveyer, the combination with a curved trolley rail, of a wheel having a radius approximately equal to the radius of curvature of said rail, an axle for supporting said wheel and rail in operative relation, said axle being positioned at the center of curvature of said rail, and means including a U-shaped plate extending from the axle to the rail and carrying the axle at the bottom of the U thereof for rigidly attaching said axle and said rail, said U-shaped plate being wider adjacent the bottom of the U than adjacent the free ends thereof.

4. In a trolley conveyer guiding and supporting frame, the combination with a horizontal rail bent upon itself thus forming spaced parallel track portions connected by a semi-circular curved track portion, of a member extending transversely between said parallel track portions and passing near the center of curvature of said semi-circular curved track portion, a wheel having substantially the same diameter as that of the curved track portion and positioned with its axis of rotation at the center of curvature of said curved portion, an axle for supporting said wheel as aforesaid, said axle being rigidly attached to said transversely extending member, and means comprising a U-shaped reinforcing member attached at its bottom to the transversely extending member and at its free ends to the rail, said axle being rigidly connected between the sides of said U-shaped member and adjacent the bottom of the U thereof.

5. In a trolley conveyer guiding and supporting frame, the combination with a horizontal rail bent upon itself thus forming spaced parallel track portions connected by a semi-circular curved track portion, of a member extending transversely between said parallel track portions and passing near the center of curvature of said semi-circular curved track portion, a wheel having substantially the same diameter as that of the curved track portion and positioned with its axis of rotation at the center of curvature of said curved portion, an axle for supporting said wheel as aforesaid, said axle being rigidly attached to said transversely extending member, and means comprising a U-shaped reinforcing member attached at its bottom to the transversely extending member and at its free ends to the rail, said axle being rigidly connected between the sides of said U-shaped member and adjacent the bottom of the U thereof, said U-shaped member having flat side walls which increase in width from the free ends to the bottom thereof.

6. In a trolley conveyer guiding and supporting frame, the combination with a horizontal rail bent upon itself thus forming spaced parallel track portions connected by a semi-circular curved track portion, of a member extending transversely between said parallel track portions and passing near the center of curvature of said semi-circular curved track portion, a wheel having substantially the same diameter as that of the curved track portion and positioned with its axis of rotation at the center of curvature of said curved portion, an axle for supporting said wheel as aforesaid, said axle being rigidly attached to said transversely extending member, and means comprising a U-shaped reinforcing member attached at its bottom to the transversely extending member and at its free ends to the rail, said axle being rigidly connected between the sides of said U-shaped member and adjacent the bottom of the U thereof, said wheel being made of relatively light weight by having a hub connected to a spaced rim by radially extending rod spokes, whereby the entire trolley superstructure will have a minimum of weight yet be very rugged.

7. In a trolley conveyer guiding and supporting frame, the combination with a curved guide rail, of a shaft support comprising a U-shaped member connected at its ends to said rail and having a bottom bearing area of large area and providing a bearing surface for a shaft over at least half of the circumference thereof.

8. In a trolley conveyer guiding and supporting frame, the combination with a curved guide rail, of a shaft support comprising a U-shaped member connected at its ends to said rail and having a bottom bearing area and having side plates tapering to a maximum width adjacent the bottom of said member, said U-shaped member thereby providing a large bearing support for a shaft at the center of curvature of said rail.

9. In a trolley frame, the combination with a curved trolley rail, a wheel supporting axle positioned at the center of curvature of said rail, and means including a U-shaped plate extending from the axle to the rail and rigidly attached to and carrying the axle at the bottom of the U thereof for rigidly attaching said axle and said rail, said U-shaped plate being wider adjacent the bottom of the U than adjacent the free ends thereof.

10. In a trolley frame, the combination with a curved guide track formed of a bent rail, a transversely extending structural member carried by said rail and extending between two courses thereof and passing near the center of curvature thereof, a structural member extending substantially radially to said rail from said transversely extending member and having a wider base than end, a wheel axle mounted on said members and positioned at the center of curvature of said rail, and attaching means extending through said axle and at least one of said structural members.

11. In a trolley frame, the combination with a horizontal rail bent to form a curved track including straight track portions and a connecting curved track portion, of a structural member extending between said straight track portions and passing near the center of curvature of said curved track portion, a wheel supporting axle attached to said structural member and located at the center of curvature of said curved track portion, and means comprising a U-shaped reinforcing member attached at its bottom to the structural member and at its free ends to said rail, said axle being rigidly connected between the sides of the U-shaped member and adjacent the bottom of the U thereof, the side plates of said U-shaped member having a greater width at the bottom of the U than at the top thereof.

12. In a trolley frame, the combination with a horizontal rail bent to form a curved track including straight track portions and a connecting curved track portion, of a structural member extending between said straight track portions and passing near the center of curvature of said curved track portion, a wheel supporting axle attached to said structural member and located at the center of curvature of said curved track portion, and means comprising a U-shaped reinforcing member attached at its bottom to the structural member and at its free ends to said rail, said axle being rigidly connected between the sides of the U-shaped member and adjacent the bottom of the U thereof.

ALEXIS W. LEMMON.